Aug. 25, 1931.   N. A. BOYETTE   1,820,775
LOG SAWING MACHINE
Filed Dec. 17, 1927   4 Sheets-Sheet 2
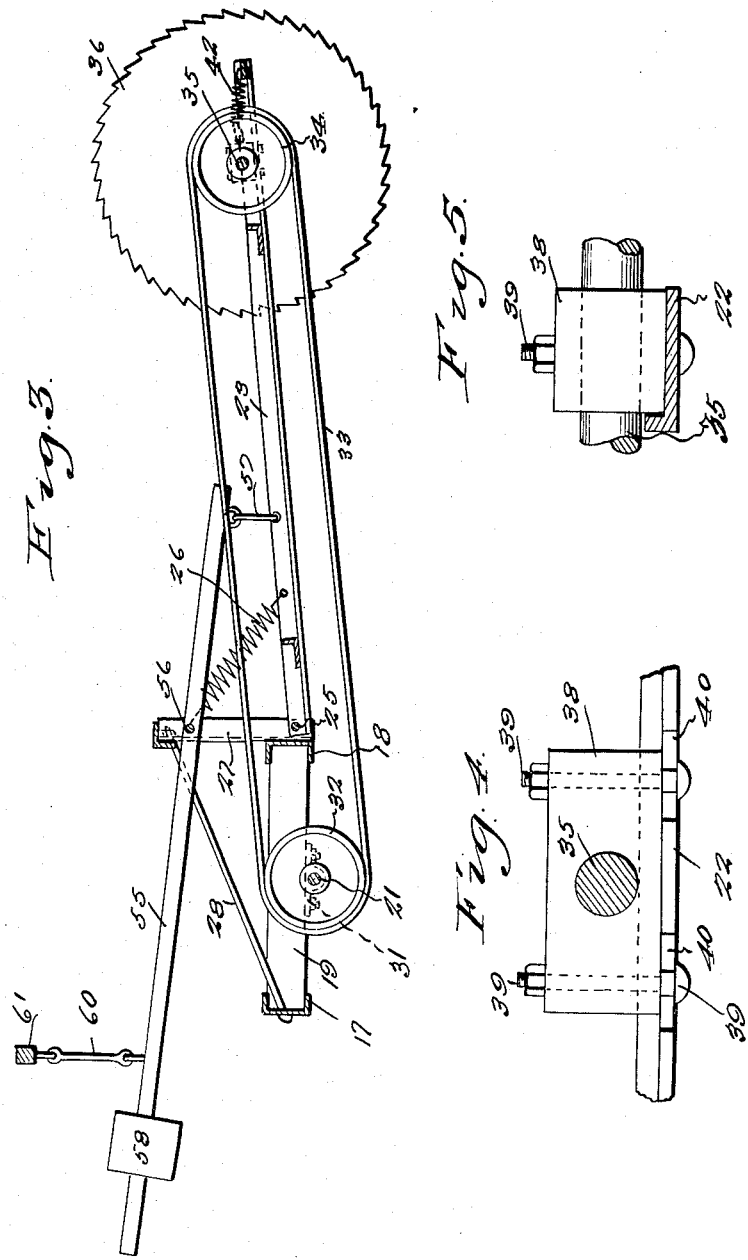

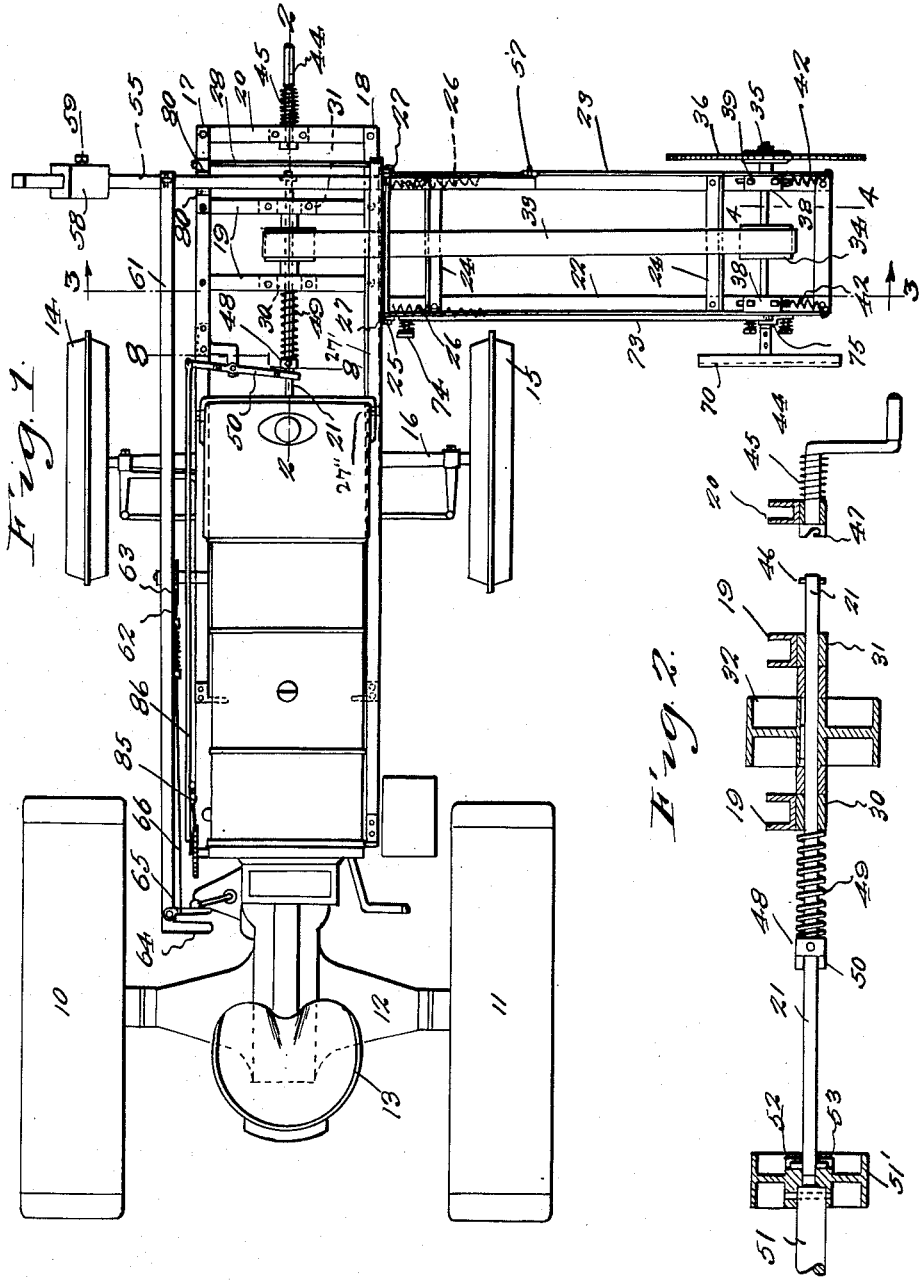

Aug. 25, 1931.  N. A. BOYETTE  1,820,775
LOG SAWING MACHINE
Filed Dec. 17, 1927  4 Sheets-Sheet 3
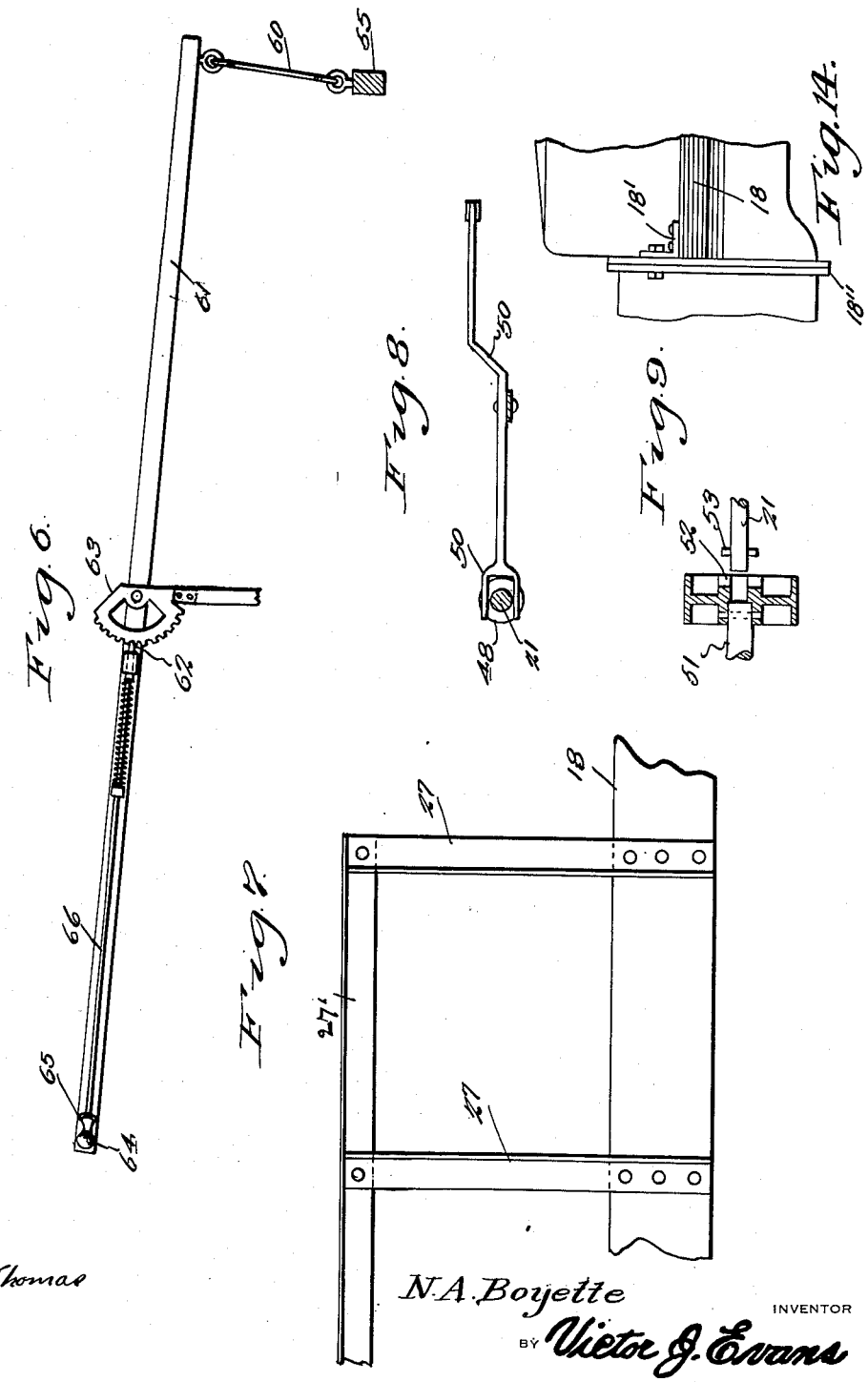
N.A. Boyette INVENTOR
BY Victor J. Evans ATTORNEY Aug. 25, 1931.  N. A. BOYETTE  1,820,775
LOG SAWING MACHINE
Filed Dec. 17, 1927  4 Sheets-Sheet 4
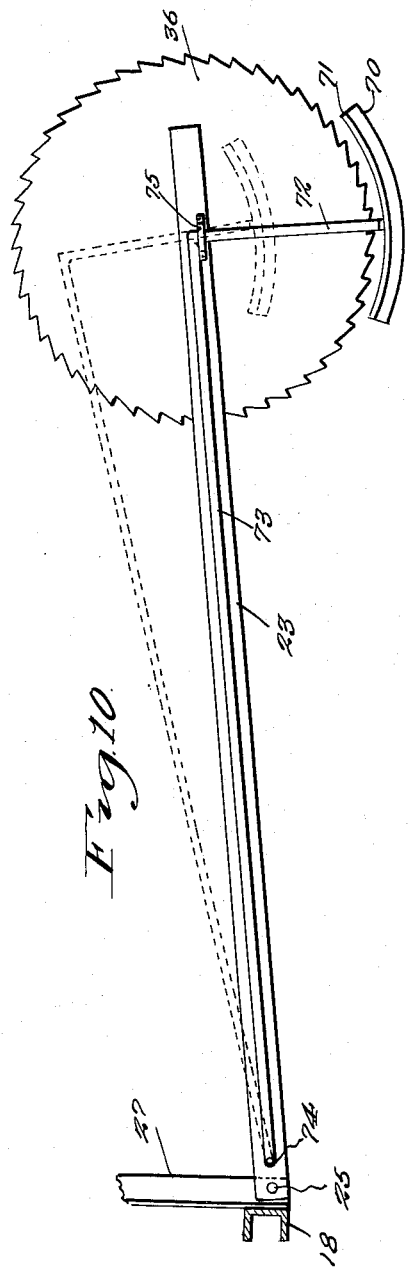
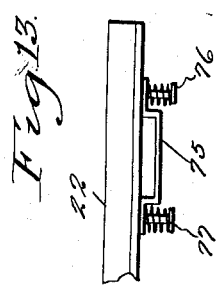
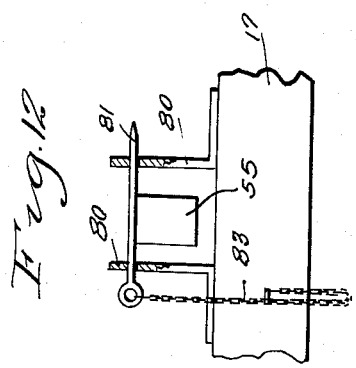
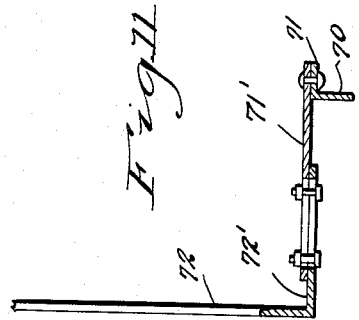
N. A. Boyette INVENTOR
ATTORNEY Patented Aug. 25, 1931

1,820,775

UNITED STATES PATENT OFFICE

NOAH A. BOYETTE, OF HAHIRA, GEORGIA

LOG SAWING MACHINE

Application filed December 17, 1927. Serial No. 240,886.

The object of this invention is to provide an attachment for a tractor of standard type, this attachment comprising a frame to be mounted in stationary position, a saw frame adapted for movement about a horizontal axis parallel with the driving shaft of the machine, and special forms of control hereinafter more fully disclosed.

A further object is to provide a counterbalanced saw frame, controlling means therefor, and particular driving mechanism including a shaft adapted to be thrown into and out of operative connection with the line shaft of the tractor.

A further object is to provide for gaging the length of the portion to be cut from the log.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 is a top plan view of the attachment as applied to a tractor.

Figure 2 is a section on line 2—2 of Figure 1, showing the driving shaft of the attachment, and the clutch connection with the shaft of the tractor.

Figure 3 is a section on line 3—3 of Figure 1, and showing the pivotal or swinging mounting of the saw frame, the means for counter-balancing this frame, and the power connections.

Figure 4 is a detail in section on line 4—4 of Figure 1, and showing a shaft mounting element.

Figure 5 shows this construction from another angle.

Figure 6 is a view chiefly in elevation showing the lever for determining the position of the swinging saw frame.

Figure 7 is a detail in elevation, showing uprights connected with one of the side elements of the main frame, and an upper longitudinal connecting bar for securing the attachment to the radiator structure of the tractor.

Figure 8 is a section on line 8—8 of Figure 1, and showing an arm forming a part of the clutch shifting mechanism.

Figure 9 is a detail in section thru the elements of the clutch.

Figure 10 shows the saw in elevation, and a gaging device mounted as indicated below.

Figure 11 is a detail view showing connections between certain of the elements referred to below.

Figure 12 is a detail chiefly in elevation showing means for securing one of the elements determining the position of the swinging saw frame.

Figure 13 shows a resiliently mounted U-shaped bracket employed in the mounting of the gaging device.

Figure 14 is a detail view showing an angle bracket for use between the side elements of the frame and the engine block of a standard tractor.

The tractor includes the rear wheels 10 and 11, the usual housing 12, the operator's seat 13, and the front wheels 14 and 15 carried by axle 16.

The sawing attachment includes a main frame having side bars such as 17 and 18, preferably of channel form and connected by transverse bars such as 19 and 20. Between the side bars 17 and 18 I mount a driving shaft 21, this shaft being adapted to be thrown into and out of operative connection with the shaft of the tractor, and designed to impart movement thru suitable means to a saw shaft.

The saw frame includes the side elements 22 and 23 connected by cross members such as 24, and this frame is pivotally mounted on the main frame, the pivotal connection being shown at 25, and coiled springs being shown at 26, having their ends connected respectively with the saw frame and with uprights 27. Tie rods or braces are shown at 28, and have their opposite ends secured as shown in Figure 3. In Figures 1 and 7, an upper bar 27′ connects the elements 27 carried by the frame, one member of the frame being shown at 18, and said bar 27′ is secured at 27" being there connected with the upper portion of the radiator. Angle brackets such as 18' are adapted to connect the frame including side bar 18 with the flange or flanges at 18" where the engine block of a Ford tractor is bolted to the transmission housing.

Bearings for the shaft 21 are designated 30 and 31, and this shaft has keyed thereon a pulley wheel 32 driving a belt 33, this belt passing around pulley wheel 34 on saw shaft 35. The saw is designated 36, and is mounted outside of the frame, the shaft 35 being carried in slidable bearing blocks or bearing elements 38 which are movable with reference to the frame elements 22 and 23, being mounted as shown in Figure 4. The bolts 39 pass thru slots 40 in the frame members just referred to, and the bearing blocks are limited in their movement by springs 42.

The driving shaft 21 may be turned over by a crank 44 adapted to be thrown out by a spring 45, and adapted to have detachable connection in the manner shown at 46, 47, with shaft 21.

A collar 48 on shaft 21, is rigid therewith, causes sliding movement thereof, and retains a coiled spring 49, the opposite end of which abuts one of the transverse members or the bearing element mounted thereon, and the collar 48 is to be engaged by pivoted arm 50 adapted for operation in such manner that the shaft 21 will be thrown out of operative connection with the shaft 51 constituting the line shaft of the tractor. Clutch elements 52 and 53 are interposed between the shafts 21 and 51, and are thrown out when shaft 21 is moved to the right in Figure 2 against the tension of spring 49. Clutch element 52 is shown as formed on the hub of pulley 51' for driving a radiator fan or the like (not shown), the pulley being rigid on shaft 51. Clutch lever 85, rod 86, and forked arm 50 hold the clutch inactive when desired because of engagement between forked arm 50 and collar 48.

The position of the saw frame is determined by the mechanism shown in Figures 1 and 3, and it will be observed that a lever 55 is pivoted at 56 to an upright 27, and has connection by means of link 57 with the element 23 of the saw frame. Lever 55 carries a slidable weight 58 retained by a set screw or bolt 59, the weight acting as a counter-balance. Lever 55 is connected by link 60 with operating lever 61, and the latter is retained in an adjusted position by engagement between the detent 62 and the segment 63. A handle carried by the lever 61 is designated 64, and a smaller handle or pivoted arm 65 controls rod 66 for operating the spring-held detent 62.

A gaging device includes a segmental element 70 having a flange 71 and being mounted by relatively adjustable slotted elements 71' 72' on the arm 72 carried by arm 73 mounted for pivotal movement at 74. The arm 72 operates thru U-shaped bracket 75 resiliently mounted on the saw frame by means of pins 76 and springs 77. The gage is brought into contact with the end and surface of the log, for determining the length of the section to be cut off by the saw, as the result of adjustment at 71' 72'. The gage recedes to the dotted line position of Figure 10 as the saw proceeds.

A retaining device for the arm or lever 55 for lifting the saw frame, is shown in Figure 12, and includes angle brackets 80, between which said element 55 to be secured is adapted to pass, a detachable retaining pin being shown at 81 as passing thru brackets 80, on the side bar 17 of the frame, and being connected with the frame by a chain 83.

It will be readily understood that in operation the clutch is thrown in by the operation of the lever 85 controlling rod 86 and arm 50, for releasing collar 48 and permitting the longitudinal movement of the shaft 21 under the action of spring 49. The gaging device 70 is properly applied, and the swinging saw frame is lowered by the operation of lever 61 controlling the transverse arm or lever 55. The relative movement permitted between the gage and the saw frame is shown in dotted lines in Figure 10.

What is claimed is:

In a device of the class described, a main frame for attachment to a tractor, a swinging saw frame mounted on the main frame, a saw operatively mounted on the saw frame, and a gaging device carried by the saw frame and movable transversely of the axis of rotation of the saw, said axis of rotation being parallel with and spaced from the path of travel of the tractor and of the longitudinal axis of the main frame, and the forward movement of the tractor parallel with the log positioning said gage and saw longitudinally of the log.

In testimony whereof I affix my signature.

NOAH A. BOYETTE.